US000001206H

United States Statutory Invention Registration [19]

[11] Reg. Number: H1206

Thibodeaux et al.

[43] Published: Jul. 6, 1993

[54] CASCADE CROSSFLOW TOWER

[75] Inventors: Louis J. Thibodeaux; Douglas P. Harrison; Kalliat T. Valsaraj, all of Baton Rouge, La.

[73] Assignee: The United States of America as represented by the Secretary of the Air Force, Washington, D.C.

[21] Appl. No.: 649,403

[22] Filed: Jan. 24, 1991

[51] Int. Cl.[5] ..... B01D 47/00; B01D 19/00; B01D 47/16

[52] U.S. Cl. ..... 55/90; 55/38; 55/47; 55/48; 55/53; 55/54; 55/185; 55/186; 55/187; 55/188; 55/196; 55/233; 55/234; 261/94; 261/95

[58] Field of Search ..... 55/38, 47, 48, 53, 54, 55/90, 185–188, 196, 233, 234; 261/94, 95

[56] References Cited

U.S. PATENT DOCUMENTS

| | | | |
|---|---|---|---|
| 339,669 | 4/1886 | Lillie | 55/233 X |
| 841,674 | 1/1907 | Dodge | 55/233 X |
| 2,926,754 | 3/1960 | Ragatz | 55/53 X |
| 3,151,187 | 9/1964 | Comte | 55/233 X |
| 3,324,630 | 6/1967 | Teller et al. | 55/233 X |
| 3,708,958 | 1/1973 | Duty et al. | 55/90 X |
| 3,733,777 | 5/1973 | Huntington | 55/233 X |
| 3,748,828 | 7/1973 | Lefebvre | 55/233 X |
| 3,785,121 | 1/1974 | Phelps | 55/196 X |
| 3,791,102 | 2/1974 | Huntington | 55/53 X |
| 3,812,657 | 5/1974 | Lampinen | 55/233 X |
| 4,168,958 | 9/1979 | Hartman | 55/90 X |
| 4,323,373 | 4/1982 | Fritz | 55/233 X |
| 4,358,296 | 11/1982 | Notardonato et al. | 55/38 |
| 4,526,692 | 7/1985 | Yohe et al. | 210/747 |
| 4,600,508 | 7/1986 | DeGhetto | 210/170 |
| 4,726,821 | 2/1988 | Sgaslik | 55/196 |
| 4,730,672 | 3/1988 | Payne | 166/266 |
| 4,861,352 | 8/1989 | Cheng | 55/53 |
| 4,892,664 | 1/1990 | Miller | 210/747 |
| 4,943,305 | 7/1990 | Bernhardt | 55/170 |

FOREIGN PATENT DOCUMENTS

| | | | |
|---|---|---|---|
| 48-020696 | 6/1973 | Japan | 55/185 |

OTHER PUBLICATIONS

Packed Crisscross Flow Cascade Tower Efficiencies for Methanol-Water Separation, Ind Eng, Chem Res. 1988, 1481–1487, Velaga, Thibodeaux, Eldridge, & Cho.

Air Stripping of Volatile Hydrophobic Compounds Using Packed Crisscross Flow Cascades, Wood, Locicero, Valsaraj, Harrison, and Thibodeaux, Dept of Chemical Engineering, LSU, Feb. 1990.

*Primary Examiner*—Robert L. Stoll
*Assistant Examiner*—C. Harris
*Attorney, Agent, or Firm*—Donald J. Singer; Bobby D. Scearce

[57] ABSTRACT

System and method for removing volatile organic compounds from water are described which comprise a substantially closed housing, a column of fluid permeable extended surface packing disposed between a pair of screens within said housing and extending substantially from the top to the bottom thereof, the packing and housing defining therebetween first and second diametrically oppositely disposed chambers (air plenums) extending generally from top to bottom of the housing, a liquid inlet and air outlet at the top of the housing and a liquid outlet and air inlet at the bottom of the housing for flowing water generally downwardly through the packing and for passing air generally upwardly through the first and second chambers within the housing, and a plurality of baffles with the housing dividing the first and second chambers into a plurality of stages for directing the generally upward flow of air in a crisscross fashion through the packing and generally perpendicularly to the generally downwardly flow of water.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CASCADE CROSSFLOW TOWER

RIGHTS OF THE GOVERNMENT

The invention described herein may be manufactured and used by or for the government of the United States for all governmental purposes without the payment of any royalty.

BACKGROUND OF THE INVENTION

The present invention relates generally to systems and methods for removing organics from water, and more particularly to an improved packed column and method for air stripping volatile organic compounds from groundwater.

Existing methods for removing and/or destroying organic compounds from water include incineration, liquid phase adsorption, chemical oxidation, biological oxidation, steam stripping and air stripping. Volatile organic compounds may contaminate groundwater from sources such as industrial spills, leaking underground storage tanks and improperly constructed surface impoundments and landfills. Removal of volatile organic compounds from groundwater using any of the technologies just mentioned may be effective, but additional treatment for destruction of the contaminants may be necessary since adsorption and stripping only transfer and concentrate the organics. For concentrations of but a few ppm, incineration and chemical or biological oxidation may be prohibitively expensive. Air stripping may generally be the less costly and preferred process for many groundwater decontamination applications.

The invention solves or substantially reduces in critical importance certain shortcomings in the prior art by providing a cascade crossflow air stripping system and method wherein the path along which air is flowed is disconnected at intervals from regions through which the liquid flows. The system operates in a generally countercurrent manner with liquid flowing downwardly by gravity, but the air is deflected at regular intervals by baffles causing the air flow to cross the liquid flow direction generally perpendicularly several times. Proper baffle spacing may produce marked reduction in air velocity and smaller pressure drop as compared to conventional countercurrent operation.

It is therefore a principal object of the invention to provide system and method for removing organics from water.

It is a further object of the invention to provide system and method for removing volatile organic compounds from groundwater.

These and other objects of the invention will become apparent as a detailed description or representative embodiments proceeds.

SUMMARY OF THE INVENTION

In accordance with the foregoing principles and objects of the invention, system and method for removing volatile organic compounds from water are described which comprise a substantially closed housing, a column of fluid permeable extended surface packing disposed between a pair of screens within the housing and extending substantially from the top to the bottom thereof, the packing and housing defining therebetween first and second diametrically oppositely disposed chambers (air plenums) extending generally from top to bottom of the housing, a liquid inlet and air outlet at the top of the housing and a liquid outlet and air inlet at the bottom of the housing for flowing water generally downwardly through the packing and for passing air generally upwardly through the first and second chambers within the housing, and a plurality of baffles with the housing dividing the first and second chambers into a plurality of stages for directing the generally upward flow of air in a crisscross fashion through the packing and generally perpendicularly to the generally downwardly flow of water.

DESCRIPTION OF THE DRAWINGS

The invention will be more clearly understood from the following detailed description of representative embodiments thereof read in conjunction with the accompanying drawings wherein.

DETAILED DESCRIPTION

Theoretical considerations related to the operation of the crossflow tower of the invention and experiments utilizing a prototype system for removal of certain volatile organic compounds from aqueous solutions by air stripping are presented in Wood et al, "Air Stripping of Volatile Hydrophobic Compounds Using Packed Crisscross Flow Cascades", Environmental Progress 9:1, pp 24–29 (February 1990), the entire teachings of which are incorporated by reference herein.

Figure 1:
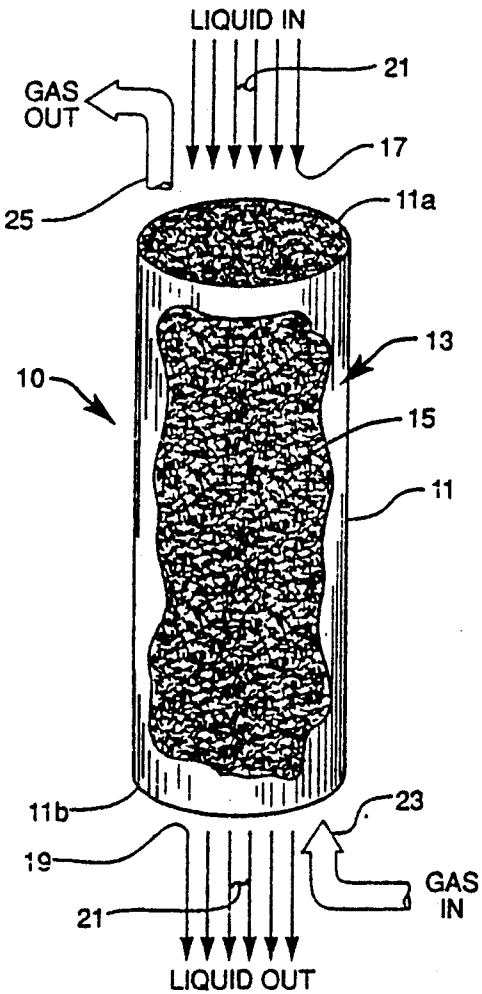
FIG. 1 is a schematic diagram in partial cutaway of a typical countercurrent packed column conventionally used in air stripping systems.

Referring now to the drawings, FIG. 1 shows schematically in partial cutaway a countercurrent packed column 10 conventionally used in air stripping systems to attain high removal efficiency. Column 10 typically comprises a generally closed tubular housing 11 containing a packed column 13 containing plastic, glass, wood, metal, ceramic, graphite or other suitable fluid permeable extended surface packing 15 substantially filling housing 11. For most applications in large scale treatment of water, housing 11 may typically be of the order of 10 to 25 feet in height by 1 to 8 feet in diameter in order to provide a liquid phase throughput in normal operation of about 10 to 1500 gpm. Inlet 17 in upper end **11*a* and outlet 19 in lower end 11*b* of housing 11 provide for passage therethrough of liquid 21 (e.g., water to be treated) from a liquid source (not shown) operatively connected to inlet 17 to a collector (not shown) operatively connected to outlet 19. Gaseous (air) inlet 23 at lower end 11*b* and outlet 25 at upper end 11*a* provide for countercurrent flow of air from a pressurized source (not shown) upwardly through packed column 13. In conventional countercurrent operation which characterizes column 10, liquid 21 flows top to bottom by gravity while pressurized air is forced from bottom to top of column 10**.

A desirable feature generally of a countercurrent system such as column 10 is a large driving force for mass transfer, since incoming air (near inlet 23) that contains no organics contacts exiting liquid depleted of organics, whereas exiting air (near outlet 25) has high organic concentration and is in contact with incoming liquid of high organic concentration. A relatively constant driving force exists throughout the column which gives rise to large mass transfer rates.

Figure 2:
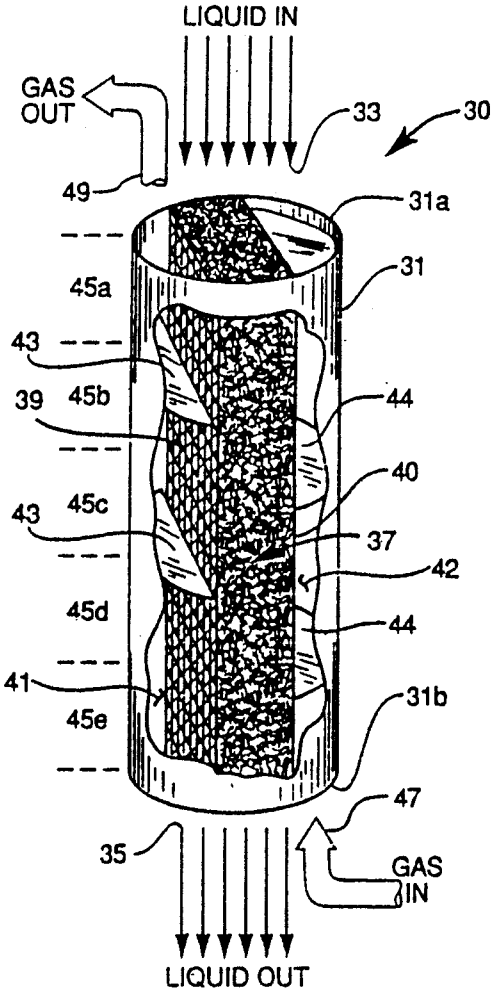
FIG. 2 is a schematic diagram in partial cutaway of a packed column of the invention.

Referring now to FIG. 2, shown schematically therein in partial cutaway is a representative column 30 of the invention. Column 30 may be of size and throughput capacity similar to that of column 10 of FIG. 1. Column 30 comprises tubular housing 31 having liquid inlet 33 at upper end 31*a* and liquid outlet 35 at lower end 31*b*. Packed column 37 extends substantially the inner length of housing 31 and may comprise any of the packing materials described above for packed column 13 of FIG. 1. In contrast to the structure of column 10, however, packed column 37 within column 30 is defined and restrained between two screens 39,40 disposed lengthwise of housing 31. Screens 39,40 may comprise substantially any structurally stable, chemically inert (to substances flowing through column 30) open mesh material. Packed column 37 is therefore substantially rectangular in cross section and is centrally disposed within housing 31, whereby diametrically oppositely disposed chambers (air plenums) 41,42 are defined on either side of packed column 37 between the inner surfaces of housing 31 and screens 39,40. Baffle means including a plurality of baffles 43,44 are disposed within housing 31 along chambers 41,42 to define corresponding plurality of stages 45*a–e* through which gaseous flow within housing 31 may be diverted back and forth through packed column 37 substantially perpendicularly to the downward flow direction of liquid therein. In the operation of the invention, air is supplied at inlet 47 and, in its generally upward countercurrent flow through column 30, is deflected by baffles 43,44 several times before exiting column 30 at outlet 49. Baffle 43,44 spacings may be selected to provide a desired air velocity through column 30 and minimum pressure differential thereacross. It is apparent from the foregoing description of the structure and operation of column 30 that housing 31 need not necessarily be cylindrical in shape, but, for example, may have rectangular or other cross section, the overall shape of column 30 therefore not being considered limiting of the invention.

Figure 3:
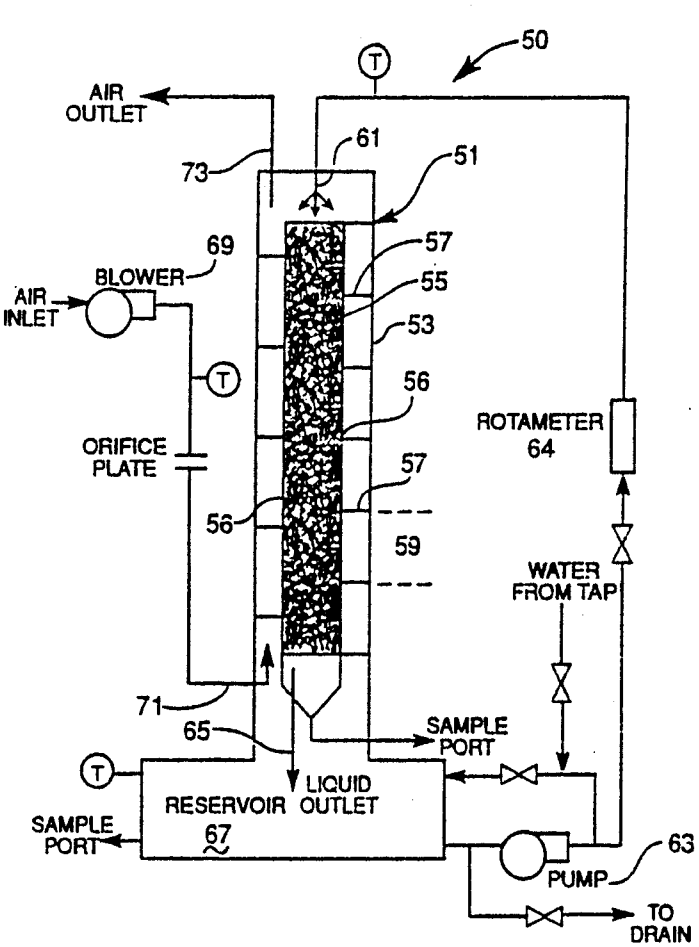
FIG. 3 is a schematic diagram of a crossflow cascade system of the invention which was used in demonstration of the invention.

Referring now to FIG. 3, shown therein is a schematic diagram of crossflow cascade system 50, including experimental column 51, similar in configuration to column 30 of FIG. 2, which was used to demonstrate the invention. Column 51 included a 6-inch diameter Plexiglas TM tubular housing 53 containing packing 55 of polypropylene Pall rings (⅝" nominal diameter) held in place by stainless steel wire mesh frames 56 extending the length of packing 55. The cross-sectional area of packing 55 comprised about 65% of the total cross-sectional area of column 51 in the experimental system. Larger or smaller cross-sectional percentage values may be successfully used depending on column size and packing material selection, the same not considered limiting of the invention. Column 51 was configured in five sections, each four feet high, which allowed column 51 to be operated with packing 55 lengths of 4–20 feet in four-foot increments. Adjustable baffles 57 defining a preselected number of stages 59 (e.g., 4 to 12 stages in an 8-foot column) for controlling air flow through column 51 were bolted to frames 56. Rubber seals between each baffle 57 and the inner surface of housing 53 prevented liquid and air from bypassing the defined paths for each. Baffle 57 spacing was adjustable to permit air velocity and volumetric flow rate to be controlled independently of liquid velocity and volumetric flow rate. A second, 12-inch diameter fixed-length, fixed-baffle pilot scale fiberglass column (not shown) was used for experimental large scale demonstration of the invention.

In column 51 operating in a semi-batch mode, contaminated water to be treated was introduced into the top of column 51 through inlet 61 utilizing centrifugal pump 63 (30 gpm capacity), and allowed to flow by gravity downwardly through packing 55. Flow was measured using rotameter 64. Water exiting column 51 through outlet 65 was collected in reservoir 67. Air was introduced from blower 69 (800 cfm) under pressure of about 0.5 to 5 inches of water at air inlet 71 at the bottom of column 51 and was directed upwardly through a circuitous crossflow path defined by baffles through packing 55 to outlet 73. Judicious selection of baffle spacing optimizes air flow area, minimizes air velocity and minimizes pressure drop across the length of the column.

In conventional countercurrent operation, as air flow is increased at a fixed liquid rate, conditions of loading and then flooding are encountered; the system will not operate at air flow rates higher than that resulting in flooding. No comparable condition results in operation of the cascade crossflow system of the invention. Since the air and water flow directions in any particular stage (59 of FIG. 3) are approximately perpendicular to each other, high air flow velocity imparts a horizontal velocity component to the water in the packing and causes water buildup on the adjacent baffle. In the next stage, however, air flow is oppositely directed so that water overflowing from the baffle encounters air flowing in the opposite direction and is forced back toward the center of the packing. The alternating air flow directions in successive stages therefore tend to redistribute the water toward the center of the packing.

Demonstration tests on the invention were performed using saturated water solutions of chloroform, methylene chloride, 1,2, dichloroethane, and carbon tetrachloride, as described in Wood et al, supra. These tests confirmed that stripping efficiencies and mass transfer coefficients utilizing the cascade crossflow scheme taught herein are comparable to or better than expected from conventional countercurrent operation. However, at equivalent water and air loading rates, the air pressure drop over the length of the column may be reduced by as much as an order of magnitude as compared to conventional systems, and stable operation was achievable at air and water loading rates which would cause a conventional countercurrent column to flood.

The invention therefore provides an improved packed column system and method for air stripping volatile organic compounds from water. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for removing volatile organic compounds from water, comprising:

a housing having a top end and a bottom end;

(b) a column of fluid permeable extended surface packing disposed within said housing and extending substantially from said top end to said bottom end, said packing configured to define within said housing first and second diametrically oppositely disposed chambers between said packing and said housing, said first and second chambers extending substantially from said top end to said bottom end of said housing;

(c) means defining a liquid inlet at said top end of said housing and means defining a liquid outlet at said bottom end of said housing for flowing water generally downwardly through said packing within said housing;

(d) means defining an air inlet at said bottom end of said housing and means defining an air outlet at said top end of said housing for passing air generally upwardly through said first and second chambers;

(e) baffle means within said housing dividing said first and second chambers into a plurality of stages for directing the generally upward flow of air within said housing in a crisscross fashion through said packing and generally perpendicularly to the generally downwardly flow of water within said packing.

2. The system of claim 1 further comprising first and second screens disposed within said housing and extending substantially lengthwise thereof and confining said packing therebetween.

3. The system of claim 1 further comprising a source of pressurized air operatively connected to said air inlet.

4. The system of claim 1 wherein said packing is a material selected from the group consisting of plastic, metal, ceramic, wood and graphite.

5. The system of claim 1 wherein said packing comprises about 65% of the cross-sectional area of said housing.

6. A method for removing volatile organic compounds from water, comprising the steps of:

(a) providing a housing including means defining a liquid inlet and an air outlet at a top end of said housing and means defining a liquid outlet and an air inlet at a bottom end of said housing;

(b) providing a column of fluid permeable extended surface packing disposed within said housing and extending substantially from said top end to said bottom end, said packing configured to define within said housing first and second diametrically oppositely disposed chambers between said packing and said housing, said first and second chambers extending substantially from said top end to said bottom end of said housing;

(c) providing baffle means within said housing dividing said first and second chambers into a plurality of stages;

(d) flowing water through said housing from said liquid inlet toward said liquid outlet generally downwardly through said packing within said housing;

(e) forcing air through said chambers from said air inlet to said air outlet generally upwardly through said stages and past said baffle means in a crisscross fashion through said packing and generally perpendicularly to the generally downwardly flow of water within said packing.

7. The method of claim 6 wherein said packing is a material selected from the group consisting of plastic, metal, ceramic, wood and graphite.

8. The method of claim 6 wherein said packing comprises about 65% of the cross-sectional area of said housing.

* * * * *